Dec. 10, 1929.  J. VAN BRUNT ET AL  1,738,544
WATER SCREEN CONNECTION
Filed Aug. 1, 1923  2 Sheets-Sheet 2

INVENTORS
John Van Brunt
George P. Jackson
BY
Synnestvedt & Lechner
ATTORNEYS

WITNESS.
Gustav Genzlinger.

Patented Dec. 10, 1929

1,738,544

UNITED STATES PATENT OFFICE

JOHN VAN BRUNT AND GEORGE P. JACKSON, OF FLUSHING, NEW YORK, ASSIGNORS TO COMBUSTION ENGINEERING CORPORATION, A CORPORATION OF NEW YORK

WATER-SCREEN CONNECTION

Application filed August 1, 1923. Serial No. 655,008.

Our invention relates to water screen connections and the like, and is especially concerned with the circulatory connections of such devices with water tube boilers, such as the Stirling, McAleenan, Kidwell, Connelly, Rust, Wickes, etc. We aim to assure good circulation of water and effective cooling for the screen; to coordinate and harmonize the screen circulation with the general boiler circulation; to avoid loss of efficiency through exposure and cooling of the screen connections; and to facilitate the installation, cleaning, or repair of the connections as from time to time required. While the invention is applicable to boilers with various types of stoker fired and other furnaces, it is especially advantageous in the case of pulverized fuel furnaces. We have here illustrated and described it as embodied and applied in connection with a Stirling boiler heated by a pulverized fuel furnace.

Figure 1:
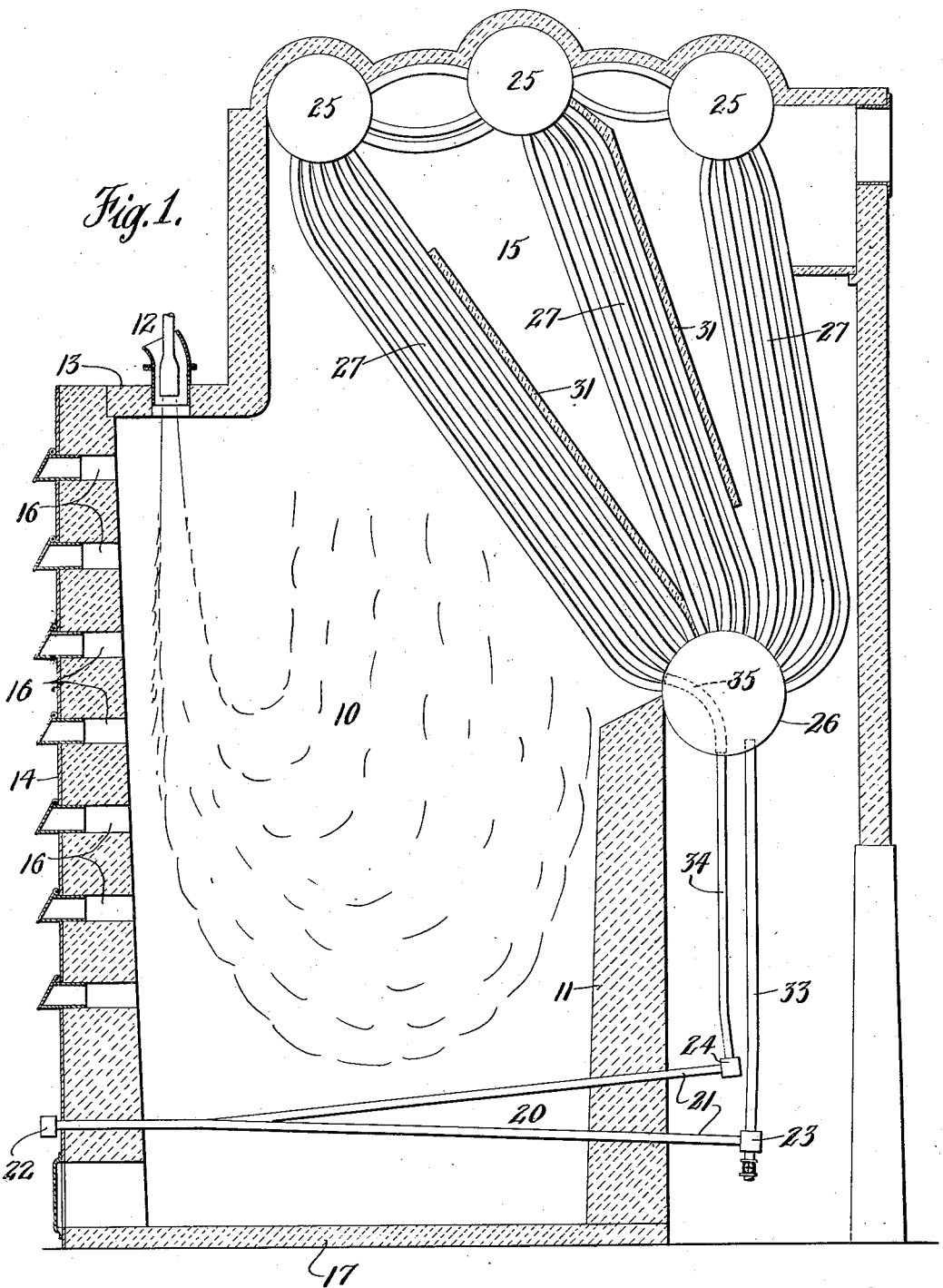

In the drawings, Fig. 1 shows a vertical section through the combustion chamber and boiler setting of such an installation.

Figure 2:
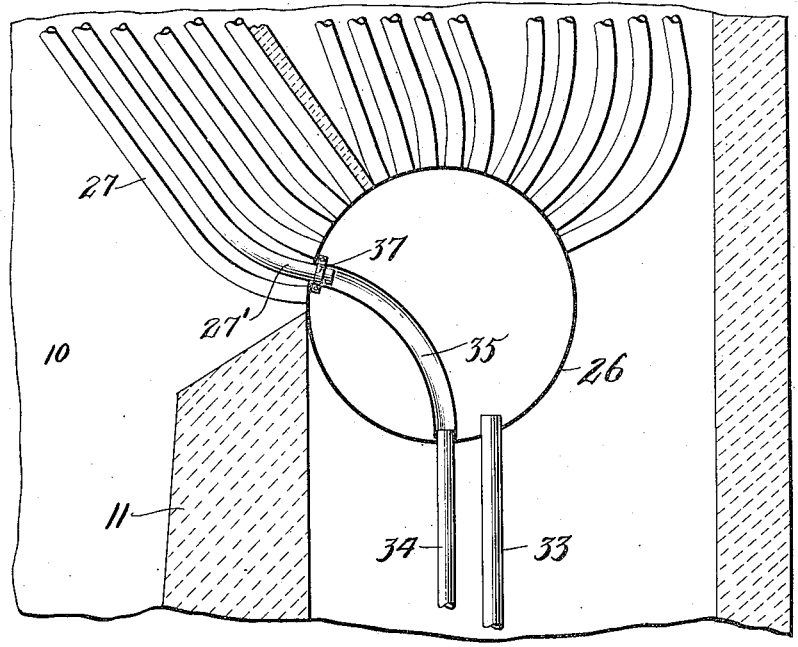
Figure 3:
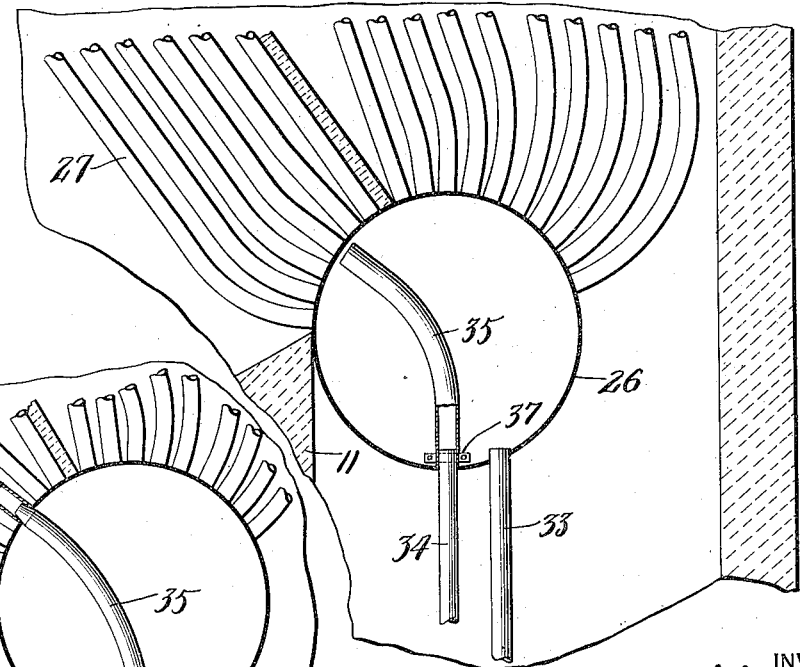
Figure 4:
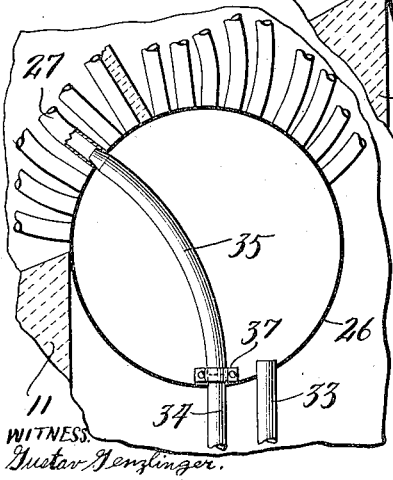

Figs. 2, 3 and 4 show a water chamber or mud drum of such a boiler in cross section, and illustrate various constructions for circulatory connections.

The installation shown in Fig. 1 has a deep combustion chamber 10 with a bridge wall 11 at its rear. Pulverized fuel with somewhat more than carrying air is admitted through a downward directed burner 12 mounted in the furnace roof 13 adjacent the front wall 14. The burning air and fuel stream descends in the front of the chamber 10 until its momentum is overcome by the draft, and then bends upward and ascends in the rear of the chamber, where it finally passes amongst the water tubes of the boiler 15. Additional air for combustion is admitted, as required, through damper controlled and regulated intakes 16 opening through the front wall 14 at various heights. The combustion chamber 10 is so deep as to permit substantially complete combustion of the fuel before the products of combustion encounter the water tubes at its upper rear region. Falling particles of refuse from the fuel fall through a cooling zone in the bottom of the chamber 10, below the region of combustion therein, and are thus cooled below fusion or slagging temperature, so as not to run together or aggregate into a solid mass on the chamber floor 17,—that could only be removed with difficulty.

Such cooling zone may be maintained either by an excess of air admitted through some of the lower openings 16, or by a water screen 20 extending across the chamber substantially above its floor 17, or by both. As shown, the water screen 20 comprises oppositely inclined water tubes 21 united at their forward ends by a header or manifold 22 outside the front wall 14, and at their rear ends connected into headers or manifolds 23, 24 behind the bridge wall 11. The size and spacing of the tubes 21 should, of course, be such as to insure effective cooling of the ash particles without undue interference with their fall.

The boiler 15 comprises upper steam and water containing means 25 in the form of transversely interconnected drums, and a lower water chamber or "mud drum" 26, with groups or banks of interconnecting water tubes 27 extending upward from the drum 26 at greater or less inclinations,—according to the design and type of boiler. Baffles 31 associated with the tube banks 27 direct the furnace gases in a succession of up and down passes amongst the tubes. Generally speaking, the water rises from the chamber 26 through the tubes exposed to the greatest heat, which, in the present instance, will be the front few rows of tubes 27 of the bank shown on the left in Fig. 1. These tubes in which the circulation is upward I have termed "risers". The water will descend from the upper drums 25 to the chamber 26 through cooler tubes or connections.

Inasmuch as the water screen 20 is exposed to great heat and is more or less depended on to maintain the very important cooling zone in the lower region of the chamber 10, it is important to provide it with ample circulatory connections and to maintain a free, vigorous, rapid flow through it. It is also highly desirable to avoid loss of heat from the connections, so as to conserve the full advantage of the water screen 20 as heating surface for the boiler and secure the highest efficiency. On the other hand, the connections should not be exposed to excessive heat, or act to cool the flaming fuel stream prematurely.

As shown, the circulatory connections for the screen 15 comprise downtake and uptake pipes or tubes 33 and 34 extending upward to the boiler from the inlet and outlet headers 23 and 24, behind the wall 11. In the present instance, the water space whence the supply pipe 33 shown draws its supply is the drum 26; and the upper end of this pipe 33 is connected through the drum wall at the bottom, a little to the rear, so as to tap directly the colder water entering the drum through the rearmost tubes. It projects inwardly, however, to a point above the drum bottom so as not to draw sediment. The discharge connection 34 shown eventually delivers into and through one of the boiler tubes 27 in which the flow would ordinarily be upward: as shown, this is one of the highly heated tubes in the second row of the front bank. Thus not only is the screen 20 supplied with the coldest water from the drum 26, but the great upward head naturally produced by the high heat affecting the front tubes 27 is brought to bear to maintain the most vigorous and rapid circulation through the screen tubes 21. Also, the circulation through the screen 20 harmonizes with and aids the regular boiler circulation. As will be observed, the uptake or discharge connection 34 extends through the bottom wall of the drum and across through its interior to (or close to) one of the tubes 27.

In the particular constructions here shown, the pipe 34 is not one with the tube 27' into which it delivers, but separate. As shown in Figs. 1 to 4, indeed, the ends of the tubes 27' and 34 are expanded into the walls of the drum 26 just about as usual, and a separate pipe or tube 35 (suitably bent) is provided within the drum. This makes the matter of manufacture and installation very much simpler than if tubes 27' and 34 were (one or both) integral with the portion 35, and also affords other advantages.

As shown in Fig. 2, the ends of the tube 27' and 34 project into the drum 26 somewhat more than usual. The pipe 35 can be first slipped over one of the inward projecting tube ends and then aligned and slipped over the other, and finally secured to one of such ends to hold it in place. As here shown, the tube 35 is held in place on the end of the tube 27' by a clamp 37.

In Fig. 3, the pipe 35 is clamped about the end of the tube 34 at 37. Instead, however, of being definitely connected to the end of a tube 27, as in Fig. 1, it terminates a little short of the drum wall. This affords the advantage that while the pipe 35 may still deliver and direct its flow into one or more of the tubes 27 very effectively, there is opportunity for bubbles of steam in such flow to expand, escape, and be distributed amongst a number of the adjacent tubes 27; so that if the amount of steam in the water from the screen 20 should be very high for any reason, there will not be the same danger of burning out or bursting a particular tube 27 through complete vaporization of the small amount of water left to pass up through such tube with such steam. In other words, the steam from the tube 34 will be distributed and mingled with a greater amount of water when it enters the tubes 27. Obviously, this Fig. 3 arrangement admits of variation as regards position and alignment of the end of the pipe 35 in the drum 26.

In Fig. 4, the pipe 35 is clamped about the end of the tube 34 and definitely connected to a particular tube 27. Instead, however, of fitting over a projecting end of such tube 27, as in Fig. 2, the pipe 35 has its end tapered to engage and fit within the tube 27. This aligned Fig. 4 arrangement has the same advantage over Fig. 2 as Fig. 3: no specially long tube 27' with projecting end need be provided, and the tube 35 can be applied at any time to any desired tube 27. In this way, the circulating head for the screen 20 can be varied from time to time, according to experience; also, the burning out or bursting of a tube 27 carrying the connection need not put the boiler out of commission longer than required to plug off the bad tube and shift the connection 35.

What we claim is:

1. The combination of a furnace and its bridge wall with a water tube boiler having a lower water chamber behind said bridge wall and risers from said water chamber, headers behind said bridge wall with tubes connected between them for circulation of water and exposed in front of said bridge wall, downtake connection from a water space of the boiler to one of said headers, and a discharge connection from the other header through said water chamber delivering to one of said risers.

2. The combination of a furnace and its bridge wall with a water tube boiler having a lower water chamber behind said bridge wall and risers from said water chamber, headers behind said bridge wall with tubes connected between them for circulation of water and exposed in front of said bridge wall, downtake connection from the lower region of said water chamber to one of said headers, and a discharge connection from the other header through said water chamber to one of the risers exposed to the hottest gases.

3. The combination of a water tube boiler with lower water chamber and riser tubes therefrom, a water screen, a tube discharging from said screen connected into a wall of said chamber, and a pipe in said chamber with one end clamped about the end of said tube from the screen, and the other end fitting into the end of one of said riser tubes.

4. The combination with a boiler and its furnace, said boiler including a lower water space and a bank of riser tubes therefrom, said tubes extending across the outlet of said furnace, of water tubes in the combustion chamber of the furnace, said tubes being subject to high heat; and means within the water space for delivering the discharge of said water tubes to certain of the tubes of the riser bank.

5. The combination with a boiler and its furnace, said boiler including an upper water and steam drum, a lower water drum and a bank of riser tubes connecting said drums, of a row of water tubes in the combustion chamber of the furnace, said tubes being subject to high heat; and means within the lower water drum connecting said water tubes to certain of the tubes of the riser bank.

6. The combination with a boiler and its furnace, said boiler including drums, and tubes connecting said drums, said tubes being subject largely to heat by convection; of water tubes in the combustion chamber of the furnace, said tubes being subject to radiant heat; and means for delivering the discharge of said radiant heat tubes to certain of the tubes of the riser bank including means passing through one of said drums.

7. The combination with a boiler and its furnace, said boiler including an upper water and steam drum, a lower water drum, and a bank of riser tubes connecting said drums; of water tubes in the combustion chamber of the furnace, said tubes being subject to high heat and delivering their discharge to the upper drum through the intermediary of means passing through the lower drum and certain of the tubes of said bank.

8. The combination with a boiler and its furnace, said boiler including an upper water and steam drum, a lower water drum, and a bank of riser tubes connecting said drums; of water tubes in the combustion chamber of the furnace, said tubes being subject to high heat and delivering their discharge to the upper drum through the intermediary of certain of the tubes of said bank having connection through the lower drum with said water tubes.

9. The combination with a boiler and its furnace, said boiler including an upper water and steam drum, a lower water drum, and a bank of riser tubes connecting said drums; of water tubes in the combustion chamber of the furnace, said tubes being subject to high heat; a tube discharging from said water tubes connected into a wall of the lower drum; and means in said drum establishing communication between said tube and certain of the tubes of said bank.

10. The combination of a water tube boiler with lower water chamber and riser tubes therefrom, water tubes in the combustion chamber subject to high heat, a tube discharging from said water tubes, and a pipe in said chamber having connection at one end with said discharge tube and at the other end with one of said riser tubes.

11. The combination with a boiler and its furnace, said boiler including an upper and lower drum and riser tubes connecting said drums, of a row of water tubes marginal of and subject to the heat of the combustion chamber of the furnace and means within the lower water drum connecting said water tubes to certain of the riser tubes.

12. The combination with a boiler and its furnace, said boiler including a plurality of upper drums and a lower drum, and banks of tubes connecting the upper drums with the lower drums of a row of water tubes marginal of and subject to the heat of the combustion chamber of the furnace and means within the lower water drum connecting said water tubes to tubes of the bank nearest the combustion chamber.

In testimony whereof, we have hereunto signed our names.

JOHN VAN BRUNT.
GEORGE P. JACKSON.